(12) United States Patent
Rogoll et al.

(10) Patent No.: US 7,698,103 B2
(45) Date of Patent: Apr. 13, 2010

(54) DIAGNOSTIC SYSTEM FOR A MODULAR FIELDBUS BOARD

(75) Inventors: Gunther Rogoll, Karlsbad (DE); Renato Kitchener, Westergate (GB)

(73) Assignee: Pepperl + Fuschs GmbH, Mannheim (DE)

( * ) Notice: Subject to any disclaimer, the term of this patent is extended or adjusted under 35 U.S.C. 154(b) by 0 days.

(21) Appl. No.: 10/574,555

(22) PCT Filed: Sep. 24, 2004

(86) PCT No.: PCT/GB2004/004077

§ 371 (c)(1),
(2), (4) Date: May 18, 2006

(87) PCT Pub. No.: WO2005/041484

PCT Pub. Date: May 6, 2005

(65) Prior Publication Data

US 2007/0124111 A1 May 31, 2007

(30) Foreign Application Priority Data

Oct. 3, 2003 (GB) .................................. 0323178.4

(51) Int. Cl.
*G06F 11/30* (2006.01)
(52) U.S. Cl. ........................ 702/183; 702/182
(58) Field of Classification Search ................ 702/183
See application file for complete search history.

(56) References Cited

U.S. PATENT DOCUMENTS

| 5,511,223 | A | * | 4/1996 | Scecina et al. ............... 714/36 |
|---|---|---|---|---|
| 5,757,265 | A | | 5/1998 | Kogure et al. |
| 5,831,805 | A | | 11/1998 | Lotocky et al. |
| 5,970,430 | A | * | 10/1999 | Burns et al. ................. 702/122 |
| 5,978,578 | A | * | 11/1999 | Azarya et al. ............... 717/100 |
| 6,564,268 | B1 | * | 5/2003 | Davis et al. ................... 710/11 |
| 6,859,755 | B2 | * | 2/2005 | Eryurek et al. ............. 702/183 |
| 7,233,877 | B2 | * | 6/2007 | King et al. .................. 702/177 |
| 2002/0010562 | A1 | * | 1/2002 | Schleiss et al. ............ 702/183 |
| 2002/0169582 | A1 | | 11/2002 | Eryurek et al. |
| 2002/0194547 | A1 | * | 12/2002 | Christensen et al. .......... 714/43 |
| 2003/0144817 | A1 | * | 7/2003 | Smith et al. ................. 702/183 |
| 2004/0073402 | A1 | * | 4/2004 | DeLaCruz et al. ........... 702/183 |

FOREIGN PATENT DOCUMENTS

| DE | 10104908 | 8/2002 |
|---|---|---|
| WO | WO 9945621 A1 * | 9/1999 |
| WO | 02099663 | 12/2002 |

* cited by examiner

*Primary Examiner*—Bryan Bui
*Assistant Examiner*—Jonathan Teixeira Moffat
(74) *Attorney, Agent, or Firm*—Fay Sharpe LLP

(57) ABSTRACT

A diagnostic system for a modular fieldbus board carrying a number of fieldbuses connected to a bulk power supply. A monitoring transceiver means is adapted in use to one or more of the fieldbuses by means of two or more common mode and/or differential mode signal injection and/or signal detection points, which points are dispersed between the bulk power supply and the fieldbus trunk. The monitoring transceiver means can detect one or more fieldbus physical layer characteristics between two of the two or more of said points.

20 Claims, 2 Drawing Sheets

DIAGNOSTIC SYSTEM FOR A MODULAR FIELDBUS BOARD

REFERENCE TO RELATED APPLICATIONS

This application is the national phase of PCT-Application PCT/GB2004/004077 filed Sep. 24, 2004.

BACKGROUND AND FIELD OF INVENTION

This invention relates to a diagnostic system for a modular fieldbus board, for use particularly to monitor fieldbus physical layer characteristics on a modular fieldbus board carrying a number of fieldbuses.

In U.S. Pat. No. 5,831,805 there is disclosed a local power failure detection and clock disabling circuit operating within a node coupled to a bus structure. The node includes multiple ports and physical connections for supporting multiple applications. Each physical connection serves as a bus transceiver for receiving and transmitting communications over the bus structure. The node includes a local power supply and a clock signal which is provided to each of the physical connections within the node. A detection circuit is coupled to the local power supply for detecting whether or not a sufficient level of power is being supplied from the local power supply. The clock signal is always provided to a master physical connection within the node, which is responsible for repeating communications across the bus structure. The master physical connection draws power from the backup power supply source when the local power supply is not supplying a sufficient level of power. When the detection circuit has detected that the local power supply is not supplying a sufficient level of power, the clock signal is disabled to all of the physical connections within the node, except the master physical connection, in order to minimize power consumption of the node. The local applications coupled to the node are also disabled when a sufficient level of power is not supplied from the local power supply. When the detection circuit detects that the local power supply is again supplying power at a sufficient level, the clock signal is reenabled to all of the physical connections within the node and the local applications are also reenabled.

In U.S. Pat. No. 5,757,265 there is disclosed a field bus system in which transmission ability of the system can be maintained even if communication error occurs due to noises or failure of a transmission line. The system can be easily shifted at a lower cost from a conventional system to the field bus system without degrading the high reliability thereof. The transmission line is constituted by a multiple-cable transmission line having at least three transmission cables. An external power supply supplies power to field devices through a pair of transmission cables of the multiple-cable transmission line. The field devices are connected to the transmission cables through a transmission line switching unit constituted by a plurality of rectifier elements, so that the field devices are supplied with current flowing in one predetermined direction when any of the pairs of transmission cables is selected. The external power supply monitors a failure of a currently used pair of transmission cables and, upon detection of failure of the currently used pair of transmission cables, the failed pair is replaced by a normal pair of transmission cables such that the field devices are continuously supplied with power.

In US-A1-2002/169582 there is disclosed a field device coupleable to a fieldbus process communication loop, the device comprising: a power module coupleable to the loop to power the device with energy received from the loop, a fieldbus loop communicator coupleable to the loop, and adapted to bi-directionally communicate over the loop, a controller coupled to the fieldbus loop communicator, diagnostic circuitry coupled to the controller and operably coupleable to the loop, the diagnostic circuitry adapted to measure a loop-related parameter, and wherein the controller provides diagnostic information based upon the loop-related parameter.

In WO-A-02/099663 there is disclosed an intrinsically safe field bus system comprising a field bus, a power source, a terminating resistor and at least one field bus device connected to the field bus. The power source is connected to a first end of the field bus and the terminating resistor terminates the field bus on the other end. The power source generates a periodic alternating signal, has a reactance as a terminating resistor and a unit for control and adjustment of the power source according to the input impedance (ZBus) of the field bus. The field bus input current (IBus) is kept constant when the input impedance (ZBus) in a first range of operation (I) is smaller than the wave impedance (ZW) of the field bus line, and the field bus input voltage (UBus) is adjusted to a constant maximum voltage (Umax) and the field bus input current (IBus) is adjusted according to the input impedance (ZBus) if the input impedance (ZBus) exceeds the value of the wave impedance (Zw) in a second operating range (II).

In DE-A-10104908 there is disclosed an electronic device for permanent monitoring electrically measurable states or values of bus systems, such as Profibuses, field buses, etc., after the bus has been installed, with two bus conductors, a comprehensive power supply and data bus, that connects a bus master and a bus slave together. Accordingly the device samples a number of connections of the electrically measurable bus conductors using a permanent circuit connection for voltage or current measurement, testing earth connection testing the quality of the bus conductors and the signals they carry. The current testing of bus systems is based an connection of measurement meters and multimeters after installation to test the bus system and to correct any faults.

What is needed is a diagnostic system for a modular fieldbus board carrying a number of fieldbuses connected to a bulk power supply, comprises a monitoring transceiver means, such that the monitoring transceiver means can detect one or more fieldbus physical layer characteristics.

DETAILED DESCRIPTION OF THE INVENTION

Figure 1:
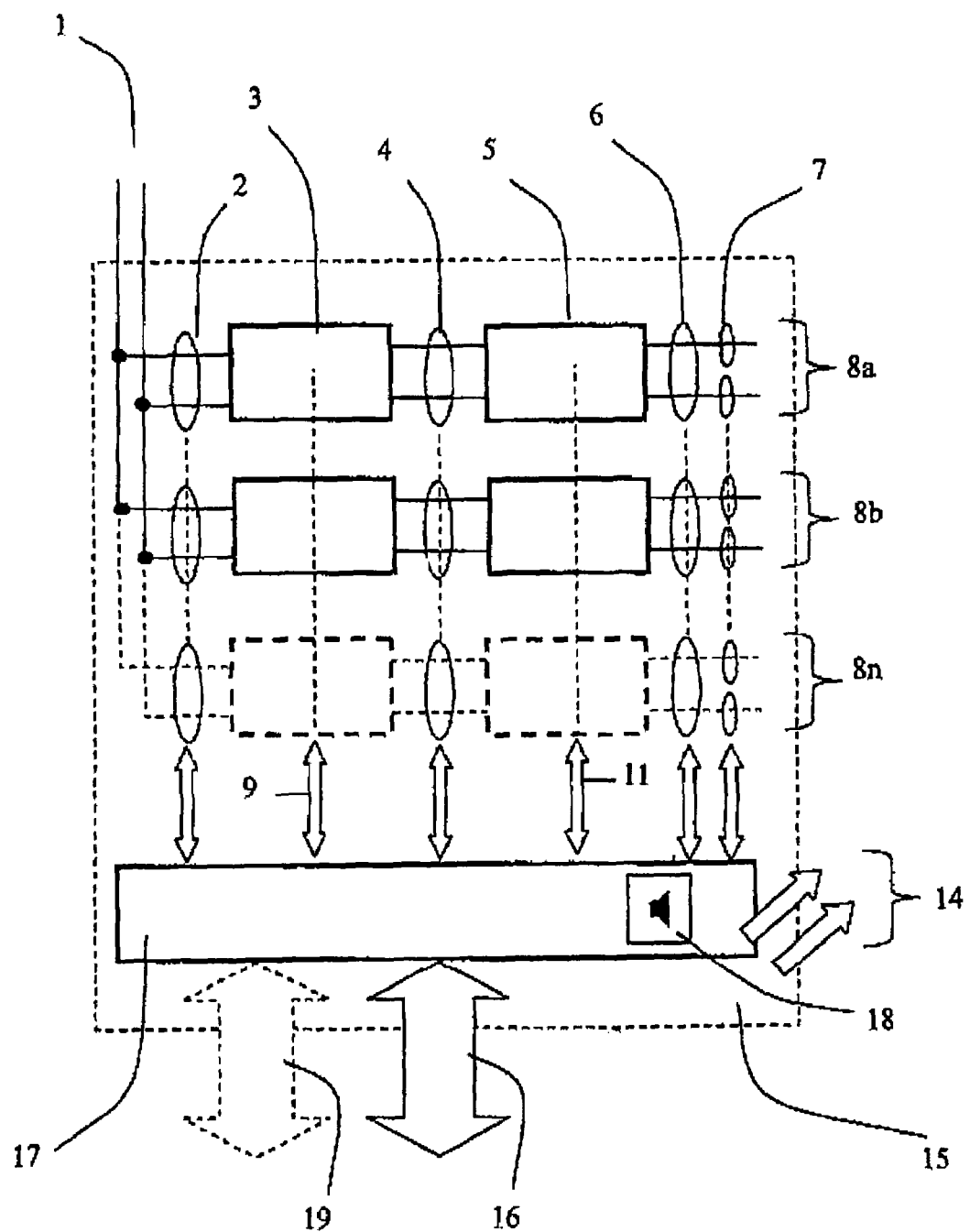
FIG. 1 is a first preferred embodiment of the present invention.

Therefore, according to the present invention a diagnostic system for a modular fieldbus board carrying a number of fieldbuses connected to a bulk power supply, comprises a monitoring transceiver means connected in use to one or more of the number of fieldbuses by means of two or more common mode and/or differential mode signal injection and/or signal detection points, which points are dispersed between the bulk power supply and the fieldbus trunk, such that the monitoring transceiver means can detect one or more fieldbus physical layer characteristics between two of the two or more of said points.

Preferably the fieldbus physical layer characteristics which are monitored comprise one or more of: over/under termination, noise/ripple level, signal level, signal bias, signal jitter, signal ringing, signal distortion, signal attenuation, cross talk, unbalance, and earth leakage.

In a preferred construction the monitoring transceiver means can also detect one or more characteristics of hardware carried on the modular fieldbus board by means of one or more of said points. The hardware can be the bulk power supply connections, power supply converters, power supply conditioners and the fieldbus trunks. The characteristics to be monitored can comprise one or more of voltage, short circuit, hardware module failure, quiescent current, and rate of charge.

The monitoring transceiver means can also be adapted to gather received data and produce one or more of: Fourier analysis, trending analysis, and data logging.

Preferably the monitoring transceiver means may be adapted to provide an alarm in the event that received data indicates one or more of pre-determined failures or the one or more fieldbuses.

In one construction the monitoring transceiver means can be provided with a first digital and/or an analogue interface, such that diagnostic data detected and/or alarms created by the monitoring transceiver means in use are transmitted to a digital or analogue device operated by a user, and such that commands can be sent in use from the user operated digital or analogue device to operate the monitoring transceiver means.

Alternatively, or in addition to the first interface, the monitoring transceiver means can be provided with visual means adapted to display diagnostic data detected and/or alarms created.

In addition, the monitoring transceiver means can be provided with a second digital and/or an analogue interface, such that diagnostic data detected and/or alarms created by the monitoring transceiver means in use can be transmitted to other associated diagnostic systems.

Preferably the monitoring transceiver means can be removable from the fieldbus board, and it can be powered in use by the bulk power supply.

In one construction one or more of the two or more common mode and/or differential mode signal injection and/or signal detection points can be disposed actually within any of the hardware carried on the board.

The invention also includes a modular fieldbus board provided with a diagnostic system as described above.

Therefore, the invention also includes a modular fieldbus board comprising a number of fieldbuses connected to a bulk power supply, and a diagnostic system comprising a monitoring transceiver means connected to one or more of the number of fieldbuses by means of two or more common mode and/or differential mode signal injection and/or signal detection points, which points are dispersed between the bulk power supply and the fieldbus trunk, such that the monitoring transceiver means can detect one or more fieldbus physical layer characteristics between two of the two or more of said points.

Preferably each of the one or more fieldbuses can comprise a connection to the bulk power supply, a power supply converter, a power supply conditioner and a fieldbus trunk.

It will be appreciated that the two or more common mode and/or differential mode signal injection and/or signal detection points can be dispersed at any points in the fieldbuses. However, in a preferred construction on each of the one or more fieldbuses a first common mode signal injection and/or signal detection point can be disposed between the bulk power supply and the power supply converter, a second common mode signal injection and/or signal detection point can be disposed between the power supply converter and the power supply conditioner, a third a common mode signal injection and/or signal detection point can be disposed between the power supply conditioner and the field bus trunk, and a differential mode signal injection and/or signal detection point can be disposed between the third common mode signal injection and/or signal detection point and the fieldbus trunk.

In addition, in a preferred construction a fourth common mode signal injection and/or signal detection point can be disposed within the power supply converter, and a fifth common mode signal injection and/or signal detection point can be disposed within the power supply conditioner.

The invention can be performed in various ways, but one of the embodiments will now be described by way of example and with reference to FIGS. 1 and 2, which show a diagrammatic displays of modular fieldbus boards, according to the present invention.

As shown in FIG. 1, a modular fieldbus board comprises a backplane 15, on which is mounted any number of fieldbuses 8a, 8b and 8n in series and a monitoring transceiver means 17, (which may also be described by those in the art as a segment autonomous diagnostic system). (The fieldbuses comprise at least fieldbuses 8a and 8b, while 8n diagrammatically signifies any number of further fieldbuses, and is therefore shown in hashed lines.)

The fieldbuses 8a to 8n are connected to bulk power supply 1, and each comprise a power supply converter 3 and a power conditioner 5.

The monitoring transceiver means 17 is provided with a first digital interface, signified by arrow 16, which in use interfaces with a user operated digital control system. Further the monitoring transceiver means 17 is provided with a second digital interface, signified by hashed arrow 19, which in use can interface with similar diagnostic systems provided on associated modular fieldbus boards (not shown).

The monitoring transceiver means 17 is further provided with visual means (signified by arrows 14) which can provide information and warning signals direct to users.

The monitoring transceiver means 17 is connected to each fieldbus 8a to 8n by first common mode signal injection and detection point 2 between the bulk power supply 1 and the power supply converter 3, by second common mode signal injection and signal detection point 4 between the power supply converter 3 and the power supply conditioner 5, by third a common mode signal injection and signal detection point 6 between the power supply conditioner 5 and the field bus trunk (not shown), and by differential mode signal injection and signal detection point 7 between the third common mode signal injection and signal detection point 6 and the fieldbus trunk (not shown).

In addition, the monitoring transceiver means 17 is connected to each field bus by fourth common mode signal injection and signal detection point (not visible, but indicated by connection arrow 9) which is disposed within the power supply converter 3, and by fifth common mode signal injection and signal detection point (again, not visible but indicated by connection arrow 11) disposed within the power supply conditioner 5. Connection between detection points 2, 4, 6 and 7 and monitoring transceiver 17 is illustrated by connection arrows 10, 12, 13 and 18.

The monitoring transceiver means 17 can monitor for fieldbus physical layer characteristics including over/under termination, noise/ripple level, signal level, signal bias, signal jitter, signal ringing, signal distortion, signal attenuation, cross talk, unbalance, and earth leakage, between any of the above described points.

In addition, the monitoring transceiver means 17 can monitor for voltage, short circuit, hardware module failure, quiescent current, and rate of charge, between any of the above described points.

The monitoring transceiver means 17 is programmed to compile received data in use and produce Fourier analysis, trending analysis, and data logging.

Further, the monitoring transceiver means 17 is programmed to provide an alarm, signified by symbol 18, either via the interfaces 16 or 19, or the visual means 14. In the event that data in use indicates one or more of pre-determined failures of the one or more fieldbuses. The indications of failures in the data are pre-programmed into the transceiver 17.

Thus, the modular fieldbus board can provide many types of information on its performance and on any potential failures to a user.

Figure 2:
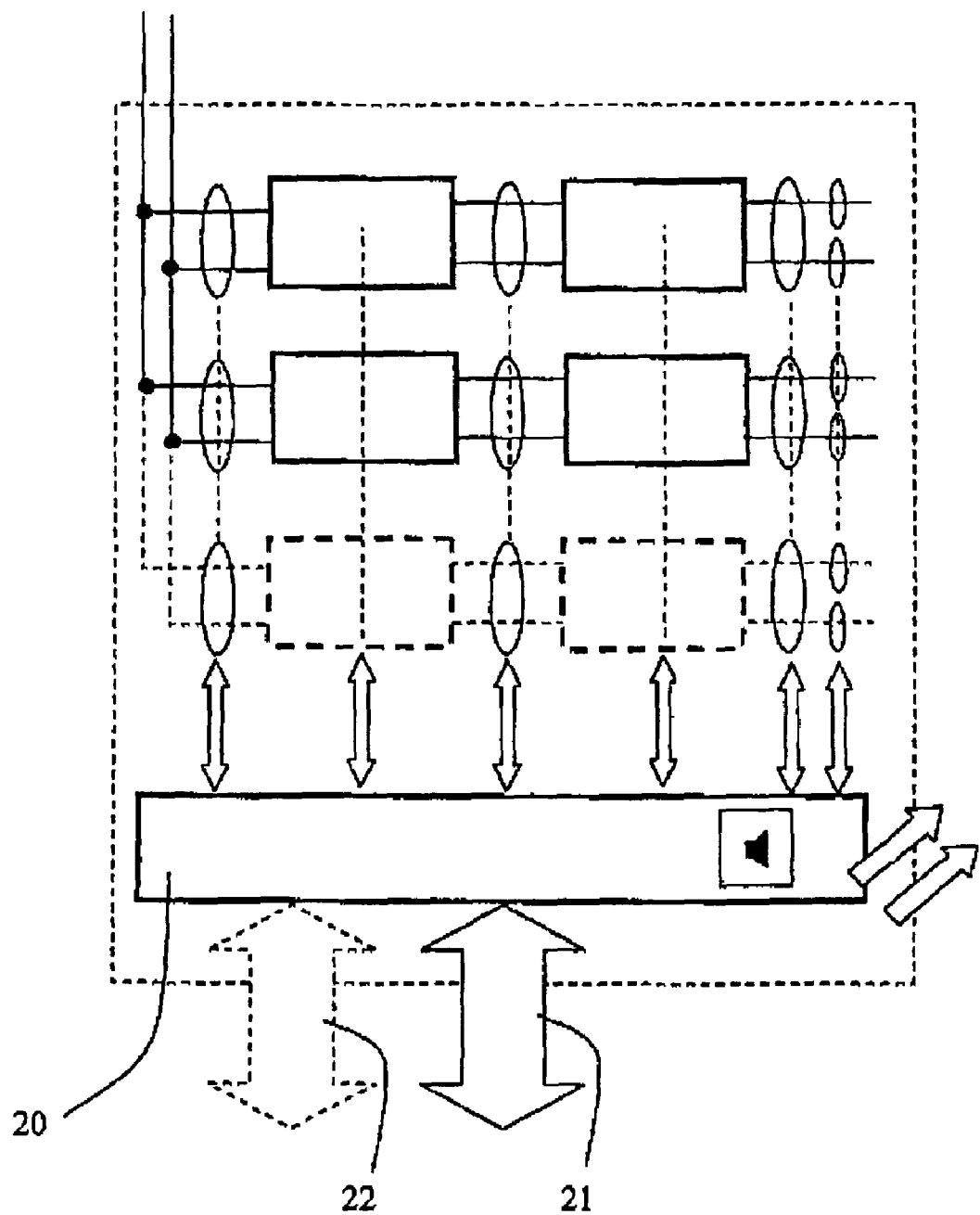
FIG. 2 is a second preferred embodiment of the present invention

FIG. 2 shows a modular fieldbus board which is the same as that shown in FIG. 1, except that the monitoring transceiver means 20 is provided with a first analog interface, signified by arrow 21, which in use interfaces with a user operated analog control system. Further, the monitoring transceiver means 20 is provided with a second analogue interface, signified by arrow 22, which in use can interface with similar diagnostic systems provided on associated modular fieldbus boards (not shown)

The invention claimed is:

1. A physical layer diagnostic system for a modular fieldbus board carrying two or more fieldbuses, the two or more fieldbuses each including a power supply converter and a power conditioner and the two or more fieldbuses connected to a bulk power supply via the power supply converter and power conditioner for each of the two or more fieldbuses, the system comprising a monitoring transceiver connected in use to the two or more fieldbuses in which each connection to each of the two or more fieldbuses comprises two or more common mode and/or differential mode signal injection and/or signal detection points, which points are collectively formed to inject and/or detect both common mode and/or differential mode signals, and wherein first points of the common mode and/or differential mode signal injection and/or signal detection points are located between the bulk power supply and the power supply converter of each of the two or more fieldbuses and second points of the common mode and/or differential mode signal injection and/or signal detection points are located between the power conditioner and a fieldbus trunk part of each of the two or more fieldbuses, such that the monitoring transceiver can detect one or more fieldbus physical layer characteristics between two of the two or more of said points, and in which the monitoring transceiver is provided with a first digital and/or analog interface adapted to transmit physical layer diagnostic data detected by the monitoring transceiver directly to an associated digital or analog device.

2. A diagnostic system as claimed in claim 1 in which the fieldbus physical layer characteristics comprise one or more of: over/under termination, noise/ripple level, signal level, signal bias, signal jitter, signal ringing, signal distortion, signal attenuation, cross talk, unbalance, and earth leakage.

3. A diagnostic system as claimed in claim 1 in which the monitoring transceiver also detects one or more characteristics of hardware carried on the modular fieldbus board by means of one or more of said points.

4. A diagnostic system as claimed in claim 3 in which the one or more characteristics of hardware comprise one or more of: voltage, short circuit, hardware module failure, quiescent current, and rate of charge.

5. A diagnostic system as claimed in claim 4 in which the monitoring transceiver is adapted to gather received data and produce one or more of: Fourier analysis, trending analysis, and data logging.

6. A diagnostic system as claimed in claim 1 in which the monitoring transceiver is adapted to provide an alarm in the event that received data indicates one or more of pre-determined failures has occurred on any of the two or more fieldbuses, and in which the first digital and/or analog interface is adapted to transmit said alarm directly to an associated digital or analog device.

7. A diagnostic system as claimed in claim 6 in which the monitoring transceiver is provided with a second digital and/or an analog interface, such that diagnostic data detected and/or alarm created by the monitoring transceiver during use are transmitted to other associated diagnostic systems.

8. A diagnostic system as claimed in claim 6 in which the monitoring transceiver is provided with visual means adapted to display diagnostic data detected and/or alarm created.

9. A diagnostic system as claimed in claim 1 in which the first digital and/or analog interface is adapted to receive operating commands from an associated digital or analog device.

10. A diagnostic system as claimed in claim 1 in which the monitoring transceiver is connected to the bulk power supply.

11. A diagnostic system as claimed in claim 1 in which one or more of the two or more common mode and differential mode signal injection and/or signal detection points are disposed within hardware carried on the board.

12. A diagnostic system as claimed in claim 1 wherein, on each of the two or more fieldbuses, third common mode and/or differential mode signal injection and/or signal detection points are disposed between the power supply converter and the power supply conditioners of each fieldbus, and fourth common mode and/or differential mode signal injection and/or signal detection points are disposed between the second common mode signal injection and/or signal detection points and the fieldbus trunk.

13. A diagnostic system as claimed in claim 12 in which fifth common mode signal injection and/or signal detection points are disposed within the power supply converter, and sixth common mode and/or differential mode signal injection and/or signal detection points are disposed within the power supply conditioner.

14. The diagnostic system as claimed in claim 1 wherein the monitoring transceiver is a segment autonomous diagnostic system.

15. A diagnostic system as claimed in claim 1, wherein the fieldbus is a two-wire system and each of the common mode and/or differential mode signal injection and/or signal detection points are connected to both wires of the two-wire fieldbus.

16. A modular field bus board comprising
a backplane;
two or more fieldbuses mounted on the backplane, the two or more fieldbuses each including a power supply converter and a power conditioner and the two or more fieldbuses connected to a bulk power supply via the power supply converter and power conditioner of each of the two or more fieldbuses, and
a monitoring transceiver connected to the two or more fieldbuses by means of two or more common mode and/or differential mode signal injection and/or signal detection points, and wherein the two or more common mode and/or differential mode signal injection and/or signal detection points are interposed between and/or within the bulk power supply, the power supply converter, the power supply conditioner and the fieldbus trunk, such that the monitoring transceiver can detect one or more fieldbus physical layer characteristics between two of the two or more of said two or more common mode and/or differential mode signal injection and/or signal detection points.

17. A modular fieldbus board as claimed in claim 16 in which, on each of the one or more fieldbuses, a first common mode and/or differential mode signal injection and/or signal detection point is disposed between the bulk power supply and the power supply converter, a second common mode and/or differential mode signal injection and/or signal detection point is disposed between the power supply converter and the power supply conditioner, a third common mode and/or differential signal injection and/or signal-detection point is disposed between the power supply conditioner and the fieldbus trunk, and a fourth common mode and/or differential mode signal injection and/or signal detection point is disposed between the third common mode and/or differential mode signal injection and/or signal detection point and the field bus trunk.

18. A modular fieldbus board as claimed in claim 17 in which a fifth common mode and/or differential mode signal injection and/or signal detection point is disposed within the power supply converter, and in which a sixth common mode and/or differential mode signal injection and/or signal detection point is disposed within the power supply conditioner.

19. A modular fieldbus board comprising:
   a backplane;
   a bulk power supply;
   a plurality of fieldbuses, each fieldbus including a power supply converter, a power conditioner and a fieldbus trunk, mounted on the backplane, and each fieldbus is connected to the bulk power supply via each power supply converter of each of the plurality of fieldbuses;
   two or more members selected from the group consisting of:
      common mode signal injection points,
      common mode signal detection points,
      differential mode signal injection points, and
      differential mode signal detection points,
   connected to each of the plurality of fieldbuses, wherein the points are formed to inject and/or detect both common mode and differential mode signals to each of the plurality of fieldbuses, and wherein first points of the group of points are interposed between the bulk power supply and the power supply converter, and second points of the group of points are interposed between the power conditioner and the field bus trunk; and
   a monitoring transceiver connected to two or more of the plurality of fieldbuses by means of two or more of the group of signal injection and/or signal detection points, such that the monitoring transceiver can detect one or more fieldbus physical layer characteristics between two of the two or more of said points.

20. A modular fieldbus board comprising two or more fieldbuses, the two or more field buses each including a power supply converter and a power conditioner and the two or more fieldbuses connected to a bulk power supply via the power supply converter and the power conditioner for each of the two or more fieldbuses, the modular fieldbus board is provided with a diagnostic system comprising:
   a monitoring transceiver connected to the two or more fieldbuses, in which each connection to a fieldbus comprises two or more common mode and/or differential mode signal injection and/or signal detection points, which points are collectively formed to inject and/or detect both common mode and/or differential mode signals, and wherein first points of the common mode and/or differential mode signal injection and/or signal detection points are located between the bulk power supply and the power supply converter of each of the two or more fieldbuses and the second points of the common mode and/or differential mode signal injection and/or signal detection points are located between the power conditioner and a fieldbus trunk part of each of the two or more fieldbuses, and in which the monitoring transceiver is adapted to detect one or more fieldbus physical layer characteristics between any signal injection point and any signal detection point.

* * * * *